United States Patent
Daniel

[15] 3,667,609
[45] June 6, 1972

[54] APPARATUS FOR COLLECTING OIL FROM THE SURFACE OF A BODY OF WATER

[72] Inventor: William H. Daniel, 541 Putman Rd., Rogers, Ark. 72756

[22] Filed: Oct. 13, 1970

[21] Appl. No.: 80,350

[52] U.S. Cl. .................................210/242, 210/DIG. 21
[51] Int. Cl. ..........................................................C02b 9/02
[58] Field of Search.................210/85, 242, DIG. 21; 61/1

[56] References Cited

UNITED STATES PATENTS 3,534,858   10/1970   Harrington.......................210/DIG. 21
3,500,841   3/1970    Logan..............................210/DIG. 21
3,389,559   6/1968    Logan....................................210/242

Primary Examiner—Reuben Friedman
Assistant Examiner—T. A. Granger
Attorney—Young & Thompson

[57] ABSTRACT

Oil is collected from the surface of a body of water by immersing a tent-shaped collector just under the surface of the water. The wave action drives oil down below the tent, and the oil rising under the tent then collects in the peak of the tent whence it is conveyed upwardly by hydrostatic pressure through a conduit into a flexible collection receptacle. The apparatus may be dropped from an airplane by a parachute, in which case the collection receptacle itself can be the parachute. The apparatus is buoyant yet weighted to maintain an upright attitude and to position the tent at a desired depth.

5 Claims, 6 Drawing Figures

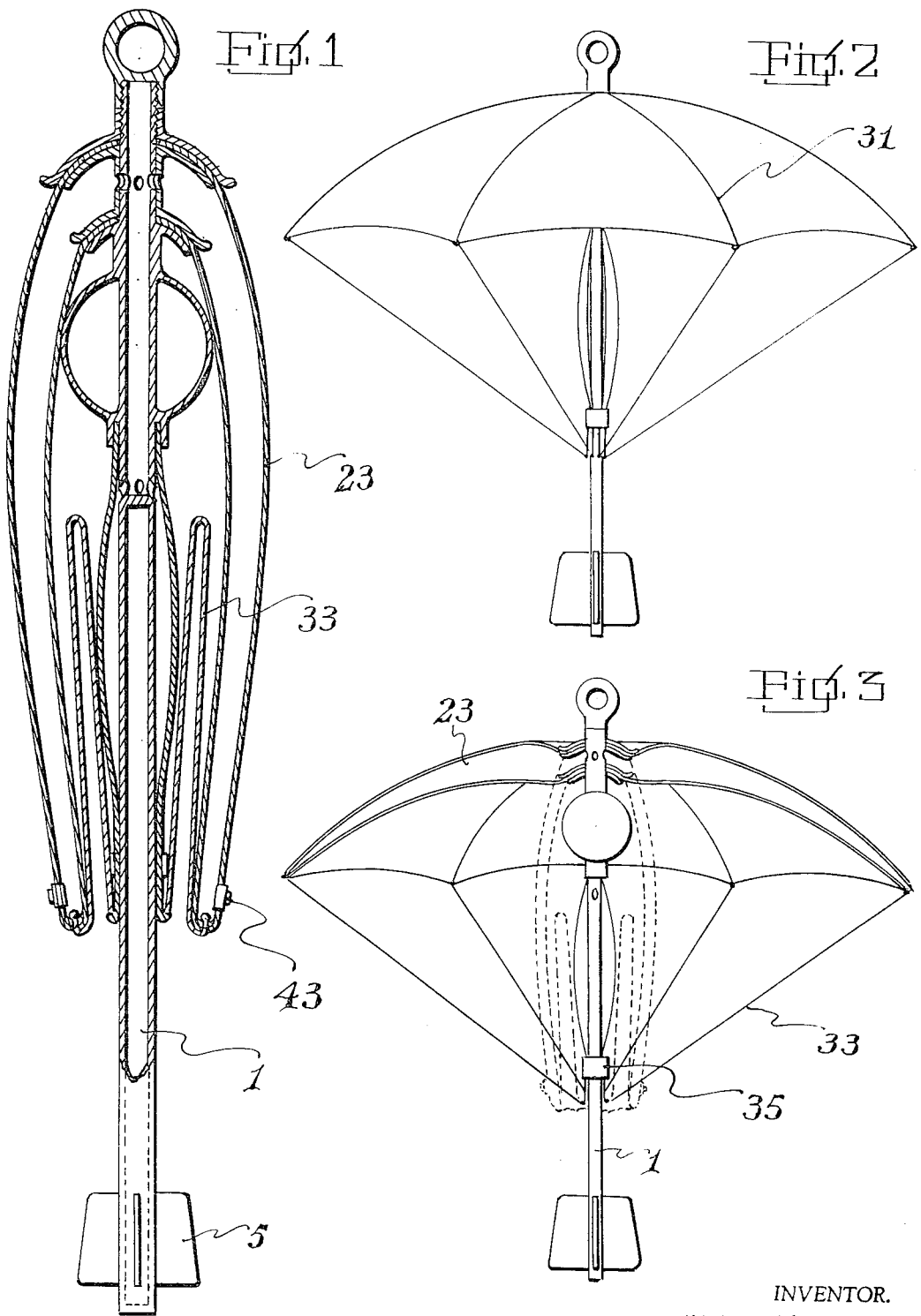

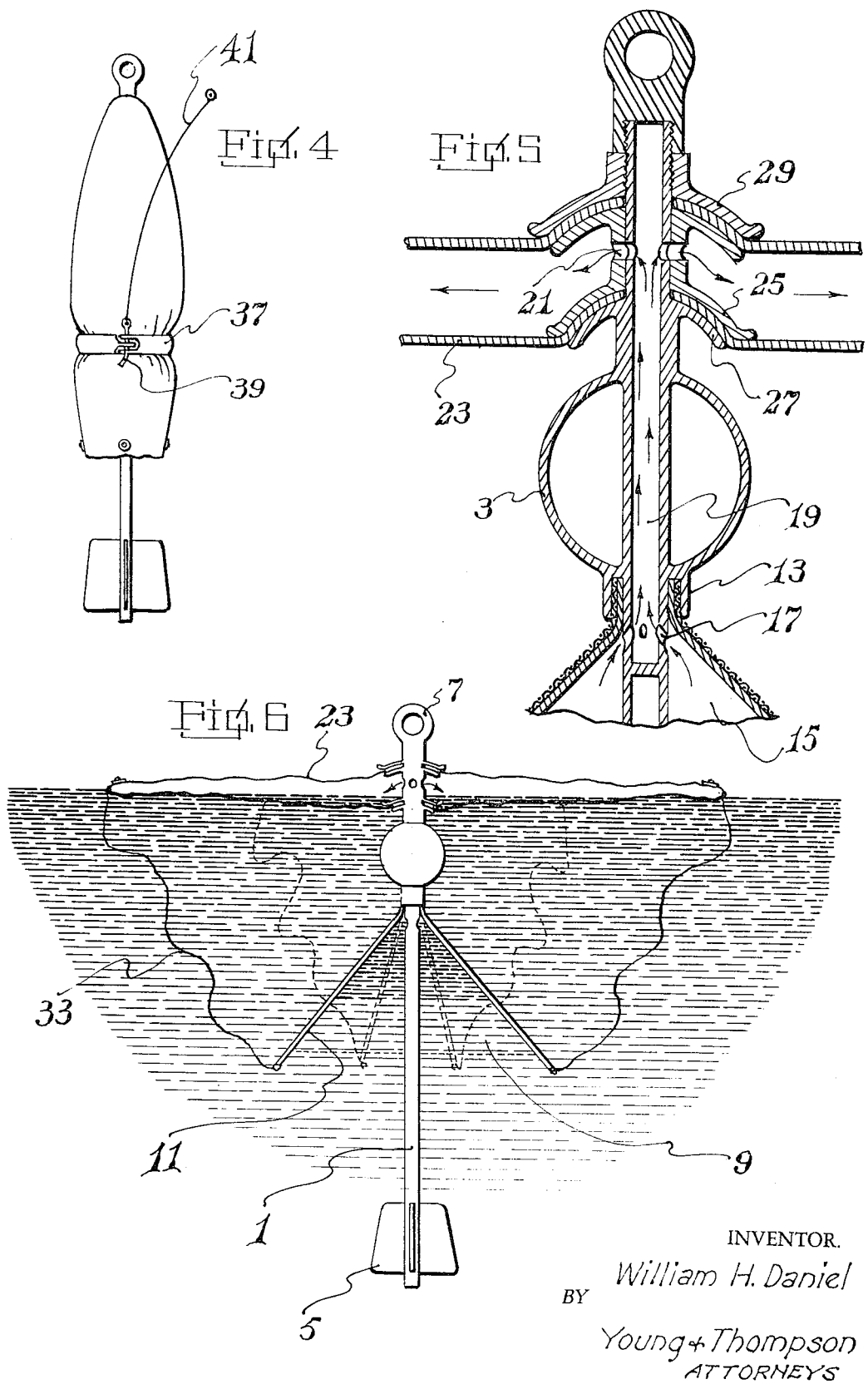

APPARATUS FOR COLLECTING OIL FROM THE SURFACE OF A BODY OF WATER

The present invention relates to apparatus for collecting oil from the surface of a body of water, more particularly of the type in which oil spills are cleaned up by effecting a water-oil separation and removing the oil.

When oil spills on or in a body of water, it tends to form a large slick which is a more or less thin layer of oil floating on the water. To clean up the oil slick, it is necessary to remove the oil from the surface of the water, and this of course can be attempted in many ways. At present, removal by mechanical collection seems to be the most feasible method.

A number of proposals have been made, of ways to skim oil from water. These skimming procedures might work very well if the oil formed a continuous flat layer of constant depth on a quiescent body of water.

In fact, however, the water on which oil slicks occur is often wave tossed and the oil is greatly agitated and mixed in with the water. The oil tends to rise to the surface of the water, only to be tumbled under again by successive waves. Thus, the actual situation often encountered at the site of an oil slick is that the surface region of the water to a substantial depth will consist of a highly agitated dispersion of oil globules or pockets in water. Thus, the most effective skimmers devised so far have been confronted with the serious problem that, under actual conditions, there is nothing to skim.

The present invention constitutes a radical departure from oil-skimming techniques and operates according to principles never before used in the collection of water from the surface of a body of water. In particular, far from being frustrated by the agitation of the oil-water mixture by the waves, the present invention makes use of that agitation in order to perform the work necessary to drive oil a substantial distance beneath the surface of the water. The hydrostatic pressure on the oil sunk to that depth tends to force the oil back toward the surface, and the present invention makes use of this hydrostatic pressure to perform the work of separating the oil from the water and collecting the oil in separated relation to the water.

Accordingly, it is an object of the present invention to provide apparatus for collecting oil from the surface of a body of water, in which the work of collection is performed by the water itself and not by the apparatus.

Another object of the present invention is the provision of such an apparatus, which operates well in rough water.

It is a further object of the present invention to provide such an apparatus which can be left unattended for long periods of time.

It is also an object of the present invention to provide such an apparatus, which will move with the oil slick.

Yet another object of the present invention is the provision of a wave-operated pump for effecting oil-water separations.

Finally, it is an object of the present invention to provide such an apparatus which will be relatively simple and inexpensive to manufacture, easy to emplace at the site of an oil slick, easy to retrieve and empty, and rugged and durable in use.

Briefly, and very broadly, according to the present invention, a tent-like structure is immersed a short distance below the surface of the water. The wave action agitates the water and drives oil globules and bodies beneath the tent-like structure. The oil rising in the tent separates from the water and collects at the top of the tent, whence the hydrostatic pressure urges it upwardly through a conduit and into container means in which the oil is collected and maintained separate from the body of the water.

Other objects, features and advantages of the present invention will become apparent from a consideration of the following description, taken in connection with the accompanying drawings, in which:

FIG. 1 is a cross-sectional view of an apparatus according to the present invention, in its collapsed condition prior to airborne delivery;

FIG. 2 is an elevational view of apparatus according to the present invention, during airborne delivery;

FIG. 3 is a view similar to FIG. 2 but showing the combined parachute and oil receptacle in cross section;

FIG. 4 is a view of the apparatus in its closed position, showing the means to open it upon airborne delivery;

FIG. 5 is an enlarged fragmentary cross-sectional view of an upper central portion of the apparatus; and FIG. 6 is a cross-sectional view showing the position of the apparatus in the water at the onset of oil collection.

Referring now to the drawings in greater detail, there is shown apparatus according to the present invention, comprising an upright standard 1 having a float 3 encompassing its upper end for maintaining standard 1 upright in the water and a set of fins 5 at its lower end for the same purpose. Fins 5 also serve as weight means to improve the stability of the apparatus in the water, the apparatus nevertheless remaining buoyant. At its upper end, standard 1 also carries an eye 7 for ease in handling and more particularly for ease in retrieval of the apparatus from the water upon completion of its oil-water separation function.

At the very heart of the present invention is a tent-like structure 9 which for simplicity will be referred to hereinafter as a "tent." Tent 9 is in the form of an umbrella in the embodiment shown in the drawings and has an inverted conical shape with its axis vertical and coincident with standard 1 and its apex uppermost. In general, however, tent 9 will have side walls that converge upwardly toward, but which do not necessarily reach, an apex. Thus, tent 9 can be conical as shown, or pyramidal, or polygonal in any of a variety of shapes and forms.

In the illustrated embodiment, tent 9 is comprised by a plurality of ribs 11, like umbrella ribs, secured to standard 1 at their upper ends within a flange 13 at the bottom of float 3. Ribs 11 in turn are covered by a flexible waterproof sheet 15 and are resilient and have a rest or undeformed position as shown in FIG. 6.

The operative position of the apparatus of the present invention in the water is shown in FIG. 6. With tent 9 extended, the waves drive oil beneath the surface of the water, and the oil rises under tent 9 and collects at the top of tent 9 in the relatively quiescent body of liquid within tent 9. Hydrodynamic pressure, however, urges the oil back toward the surface of the water, that is, upwardly; and the present invention provides means for conveying this upwardly urged oil to a collection receptacle.

Specifically, standard 1 is hollow above tent 9, and openings 17 communicate between the upper underside of the apex of tent 9 and the hollow interior of standard 1. This hollow portion of standard 1 comprises a conduit 19 that extends upwardly from openings 17 and terminates adjacent the upper end of standard 1 and that discharges through openings 21 that communicate with the interior of a flexible container 23.

Container 23 is preferably circular in shape and is traversed centrally by the upper end of standard 1 and is retained thereon in fluid-tight relationship by means of a flanged fitting 25 that surrounds the upper end of standard 1 and against the flanges of which an annular flange 27 bears which is carried by standard 1. A flange 29 bears against the upper side of container 23 and is screw-threadedly secured to the upper end of standard 1, the eye 7 being screw-threadedly received at the end of this assembly and closing the end of conduit 19. The openings 21 pass not only through the upper end of standard 1, but also through the cylindrical side wall of fitting 25.

Container 23 is of flexible waterproof material that is not attacked by oil, and may for example be Neoprene-coated nylon or the like. In the illustrated embodiment, in which the apparatus is adapted for airborne delivery, the container 23 also serves as a parachute to slow the descent of the apparatus from an aircraft. To this end, container 23 is fitted with resilient ribs 31, which are connected at their outer ends by filaments 33 to the ends of ribs 11 of tent 9. The ribs 11, in turn, are held adjacent the sides of standard 1, and the tent 9 thus maintained in collapsed position during descent of the airborne apparatus, by means of a strap 35 wound about ribs 11, the ends of strap 35 being releasably secured together by means of any water-soluble adhesive, so that after the apparatus immerses, the ribs 11 will be released and tent 9 can open under water. Actually, it need not be particularly detrimental to the operation of the device if the ribs 11 are open upon descent through the air; but it is preferred that they be closed when the device strikes the water, so as to avoid translating the kinetic energy of the fall of the apparatus into a surge of water into container 23.

In operation, container 23 is held closed by a shackle 37 as shown in FIG. 4, which is locked by a removable pin 39 secured to a rip cord 41. Cord 41 is secured at its other end to the aircraft in which the apparatus is stored; and when the aircraft is over the oil slick, the device of the present invention, and as many others like it as are needed, are discharged from the aircraft. Rip cord 41 pulls pin 39 and shackle 37 springs open, releasing container 23 to act as a parachute as seen in FIGS. 2 and 3. After the device lands in the water, with the parts still in the FIGS. 2 and 3 position, strap 35 loosens and the device assumes the FIG. 6 position, the slack in the filaments 33 permitting container 23 to assume a limp position on the surface of the water. Oil driven down beneath tent 9 by the waves collects in the upper portion of tent 9 as explained above, and passes through openings 17 up though conduit 19 and out through openings 21 into container 23, under the hydrostatic pressure exerted by the water on the submerged oil.

If there is no oil under the apex of the tent 9, but only water, then the water does not tend to be forced into container 23, because there is no hydrostatic pressure to force water upwardly through water of the same density. Thus it is substantially only the oil that is selectively pumped upwardly, so that the oil-water separation performed by the device of the present invention tends to be very good.

When container 23 is as full as desired, or when the oil slick has been completely cleaned up, then the apparatus may be retrieved from the water, for example from a boat by use of a boat hook through eye 7. Standard 1 is thus raised and container 23 tends to sag down below openings 21, so that no oil escapes. If desired, container 23 can be emptied into on-board containers by opening outlets 43 in what will now be the lowermost portion of container 23; alternatively, container 23 may be rested on an annular support with standard 1 depending through the central opening thereof, whereupon openings 21 become lowermost and oil drains through openings 21, down through conduit 19 and out through openings 17.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. Apparatus for collecting oil from the surface of a body of water, comprising a collapsible tent, weight means urging the tent toward a position submerged a short distance beneath the surface of the water, a flexible receptacle above the tent for receiving oil that collects in the upper portion of the tent, conduit means in the form of a hollow upright standard about which said tent is secured and to the upper end of which said flexible container is secured, said flexible container being traversed at its center by said upright standard, said upright standard being hollow and having an inlet communicating with the upper inner portion of said tent and an outlet communicating with the interior of said flexible container, and means imparting to said flexible container the shape of a parachute to permit airborne delivery of said apparatus.

2. Apparatus as claimed in claim 1, and means releasably holding said container in collapsed position against said standard for release of said container to serve as a parachute upon airborne delivery.

3. Apparatus as claimed in claim 1, and means for releasably holding said tent in collapsed position against said standard.

4. Apparatus as claimed in claim 3, said releasable holding means comprising means responsive to immersion of the apparatus in water to release said tent.

5. Apparatus as claimed in claim 2, said releasable holding means comprising means responsive to immersion of the apparatus in water to release said tent.

* * * * *